United States Patent [19]
Askin

[11] Patent Number: 5,285,741
[45] Date of Patent: Feb. 15, 1994

[54] METHOD OF PRODUCING A FLEXIBLE TUBULAR LINING

[75] Inventor: Michael Askin, Huntingdon, England

[73] Assignee: Insituform (Netherlands) B. V., Netherlands

[21] Appl. No.: 934,636

[22] PCT Filed: Mar. 6, 1991

[86] PCT No.: PCT/GB91/00350

§ 371 Date: Sep. 17, 1992

§ 102(e) Date: Sep. 17, 1992

[87] PCT Pub. No.: WO91/13559

PCT Pub. Date: Sep. 19, 1991

[30] Foreign Application Priority Data

Mar. 10, 1990 [GB] United Kingdom ............ 9005406.5

[51] Int. Cl.⁵ ............................................. D05B 1/22
[52] U.S. Cl. ................................ 112/262.2; 112/269.1
[58] Field of Search .................... 112/262.3, 262.2, 63,
112/162, 440, 441, 418, 269.1; 2/243 R, 272,
243 B, 275, 164, 171.8, 179, 184, DIG. 11, 181,
170; 156/218, 93, 226, 227; 428/102

[56] References Cited

U.S. PATENT DOCUMENTS

| | | | |
|---|---|---|---|
| 1,455,384 | 5/1923 | Bates | 112/63 X |
| 2,839,020 | 6/1958 | Hopkins | 112/262.2 |
| 3,246,621 | 4/1966 | Copeland | 156/93 X |
| 4,009,063 | 2/1977 | Wood | 156/93 X |
| 4,446,181 | 5/1984 | Wood | 112/424 X |

Primary Examiner—Clifford D. Crowder
Assistant Examiner—Paul C. Lewis
Attorney, Agent, or Firm—Fred Philpitt

[57] ABSTRACT

The manufacture of flexible tubes of two or more layers of a material such as felt which can absorb synthetic resin comprises feeding a first web in the direction of its length and folding the web so that its edges came face-to-face and are sewn together by stitches which loop round said edges, the second layer being wrapped around the first and its edges sewn in a similar manner, the looped stitching being such that when the tube is inflated to circular form the extremities of the edges in the stitching loops in each layer come into butting contact, whereby there are no regions where the layer has a double thickness of material.

15 Claims, 7 Drawing Sheets

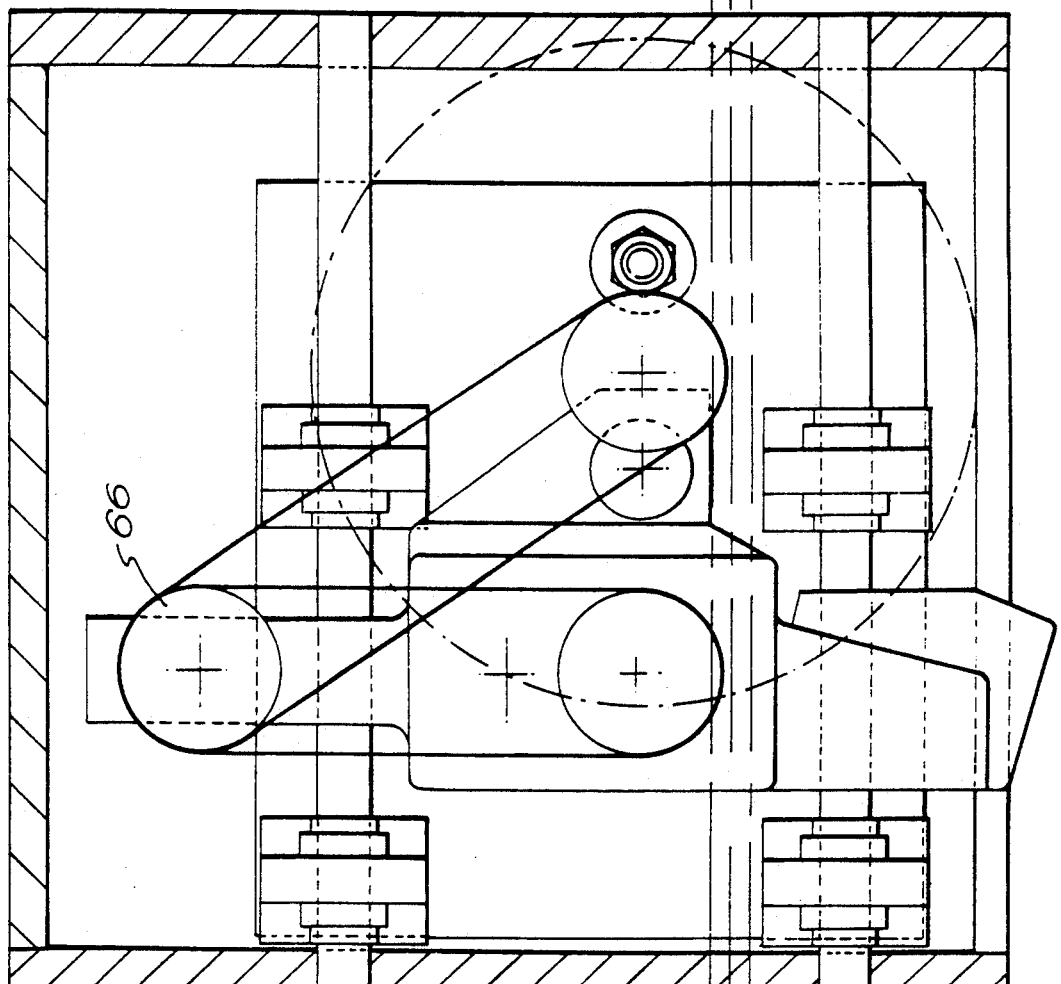

METHOD OF PRODUCING A FLEXIBLE TUBULAR LINING

This invention relates to the manufacture of tubular materials, and in particular to the manufacture of tubular materials for use in connection with a lining process for underground pipelines and passageways.

Various processes are known for the lining of underground pipelines and passageways using flexible tubular materials, such tubular materials constituting linings which are applied to the pipeline or passageway surfaces and are held in position with fluid pressure until either the lining material is adhered to the pipeline or passageway surface by means of an adhesive or curable synthetic resin which impregnates the lining (the lining being of a suitable absorbent material) cures to a rigid form, in which case the combined tubular lining material and resin form a rigid pipe lining the pipeline or passageway surface. The rigid pipe may either be adhered or bonded to the said surface by virtue of the nature of the resin used, or the rigid pipe may be free standing and close fitting.

In all cases, the lining material is a soft and flexible material, and whilst it is being placed in position the adhesive and/or resin is also in fluent condition so that the combined adhesive and/or resin and the lining materials are soft whilst being applied, but may and usually do become hard to form the said pipe after the lining operation has been completed.

Consequently, these lining methods have become known as "soft lining" methods.

By far the most successful of these methods is the INSITUFORM (Trade Mark) method of soft lining, and the most practiced INSITUFORM method is disclosed in British Patent No. 1449455. As will be understood from that patent, the lining material used in comprises at least one layer of a resin absorbent material e.g. a fibrous felt, to the outside of which is an impermeable tubular membrane, and this lining material with the felt impregnated with resin is everted into the pipeline or passageway to line same, so that eventually the membrane lies to the inside of the applied lining, whilst the impregnated felt lies adjacent the surface to be lined.

A method of fabricating tubular lining material suitable for use in this method is set forth in European Patent Application No. 79301952.2 from which it will be seen that the lining material starts off initially as a flat web with a coating on one side thereof to form the impermeable membrane, and then the material is wrapped into tubular form so that the free edges come into butting relationship and are sewn together by means of a sewing machine, the coating side being to the outside of the tubular structure. In order to seal the stitches and in particular the needle holes created in the outer coating by the stitching operation, a strip of sealing tape is applied over the stitching so as to seal said holes, the tape being bonded to the outer membrane by means of any suitable system such as heat and pressure or solvent.

In the manufacture of lining materials for this process, it has been found convenient to construct the lining material in a number of layers. That is to say, if a thick lining material is required, it is more convenient to make the lining material of a number of layers of felt rather than to produce a single felt layer of the required thickness, because to produce needled felt in a thickness much in excess of say 6–8 mm is a rather inefficient and costly process. Consequently, when it is required to produce a thick lining, it has been the practice to construct the lining material of one or more inner layers of felt only, and the single outer layer which is coated with the impermeable membrane material. Conventionally, the inner layers are also constructed from flat webs which are wrapped into tubular form with the edges in overlapping arrangement. The outer layer is wrapped around the inner layer or inner layers and finally, the butted edges of the outer layer are sewn together as described in said European Patent application.

This method creates a difficulty in practice, because as regards the or each inner layer, that layer has a double thickness of felt in the region where the edges overlap, and that double thickness region results in a locally thick region in the finished rigid pipe. This represents wasteage in terms of resin utilisation and felt utilisation.

Furthermore, the double thickness region or seam of each inner layer does not evert with the same characteristic as the remainder of the inner layer when the lining material is being installed. This can cause skewing of the lining material during eversion and extra friction to be overcome during the eversion process, which can lead to fracture of the lining material.

Because of the soft and flexible nature of the inner layers of felt, it is not possible to butt seam these layers as can be done with the outer layer, because the coating on the outer layer gives it extra rigidity and the edges in the outer layer remain sufficiently stable to enable butt seaming to take place.

The present invention however provides a means and method for overcoming the difficulties of lining material manufacture, and results in the production of a more economical tubular lining material, and a lining material which can be produced quickly and yet will be devoid of double thickness regions in any of the layers, making it particularly easy to evert in an eversion process such as described in said British Patent. It is to be mentioned however that the lining material need not be used solely for eversion purposes.

In accordance with the invention, a method of producing a tubular lining material for use in soft lining processes comprises forming the first web of resin absorbent material into a tubular form by folding the web in two so that the web edges come face to face, followed by sewing through said face to face edges, folding a second layer about the first layer in similar fashion so that the edges of the second layer come face to face, and sewing through said edges of the second layer, the sewing loops in each case being such that when the resulting tubular structure is moved to circular form, the said face to face edges separate and move into butting relationship whereby there is no overlap of the edges of any layer.

Preferably, the method is carried out in a continuous operation in that the web forming the first layer is fed continuously past a first sewing machine which sews its edges, and the second layer is folded around the first layer whilst it continues its movement, and a second sewing machine continuously sews the face to face edges of the second layer whereby a multi-layer tubular material for use in soft lining is produced.

Each of the said layers preferably comprises or includes a needled felt of an appropriate fibre or mixture of fibres.

Preferably, the second felt, or the outermost felt in the case that the resulting material has three or more of said layers, is provided on its outer surface with an impermeable coating of a synthetic resinous material such as polyurethane, and the stitching in the outermost layer is sealed by means of a sealing tape in the manner described in said European Patent Application.

Also according to the invention there is provided a lining material for soft lining processes produced according to the method of the invention.

By virtue of the invention, it will be understood that the resulting lining material will have no overlapping edges in any of its layers. Consequently, when the lining material is impregnated and everted as described in said British Patent, there will be no locally thick regions to cause eversion problems and to result in uneconomic use of resin and felt material.

When the lining material is inflated to circular form, it will essentially have constant wall thickness, something which has not been possible to achieve with the known methods of lining material fabrication.

As mentioned above, the present invention can be utilised for the production of lining materials for other soft lining processes which for example include a method of simply pulling the lining into the pipeline or passageway to be lined followed by the inflation of same by any suitable means.

An embodiment of the present invention will not be described, by way of example, with reference to the accompanying diagrammatic drawings, wherein.

Figure 8:
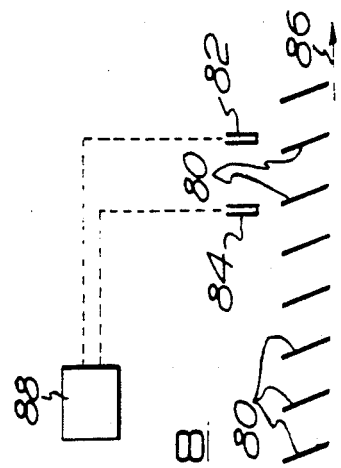
Figure 7:
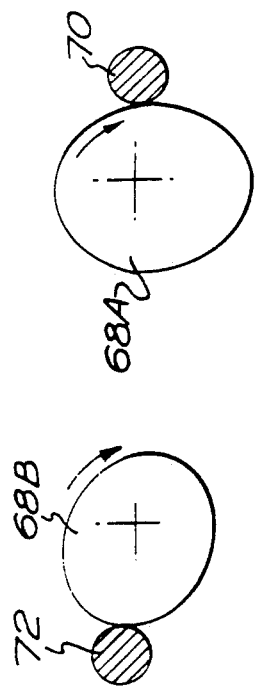
Figure 2:
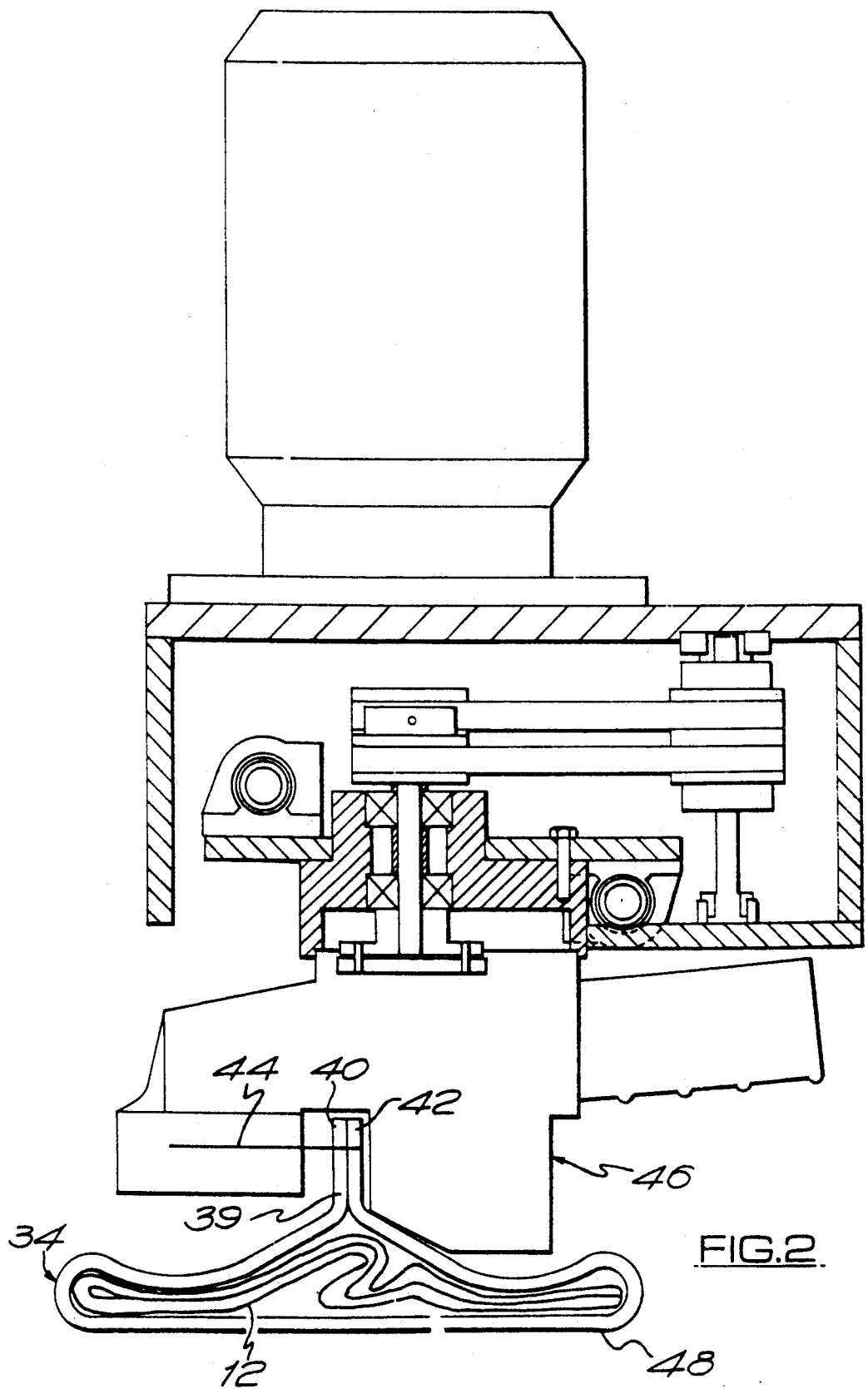
FIG. 2 is a part-sectional end view of a sewing machine head for sewing the outer layer of material in the arrangement of FIG. 1.
Figure 3:
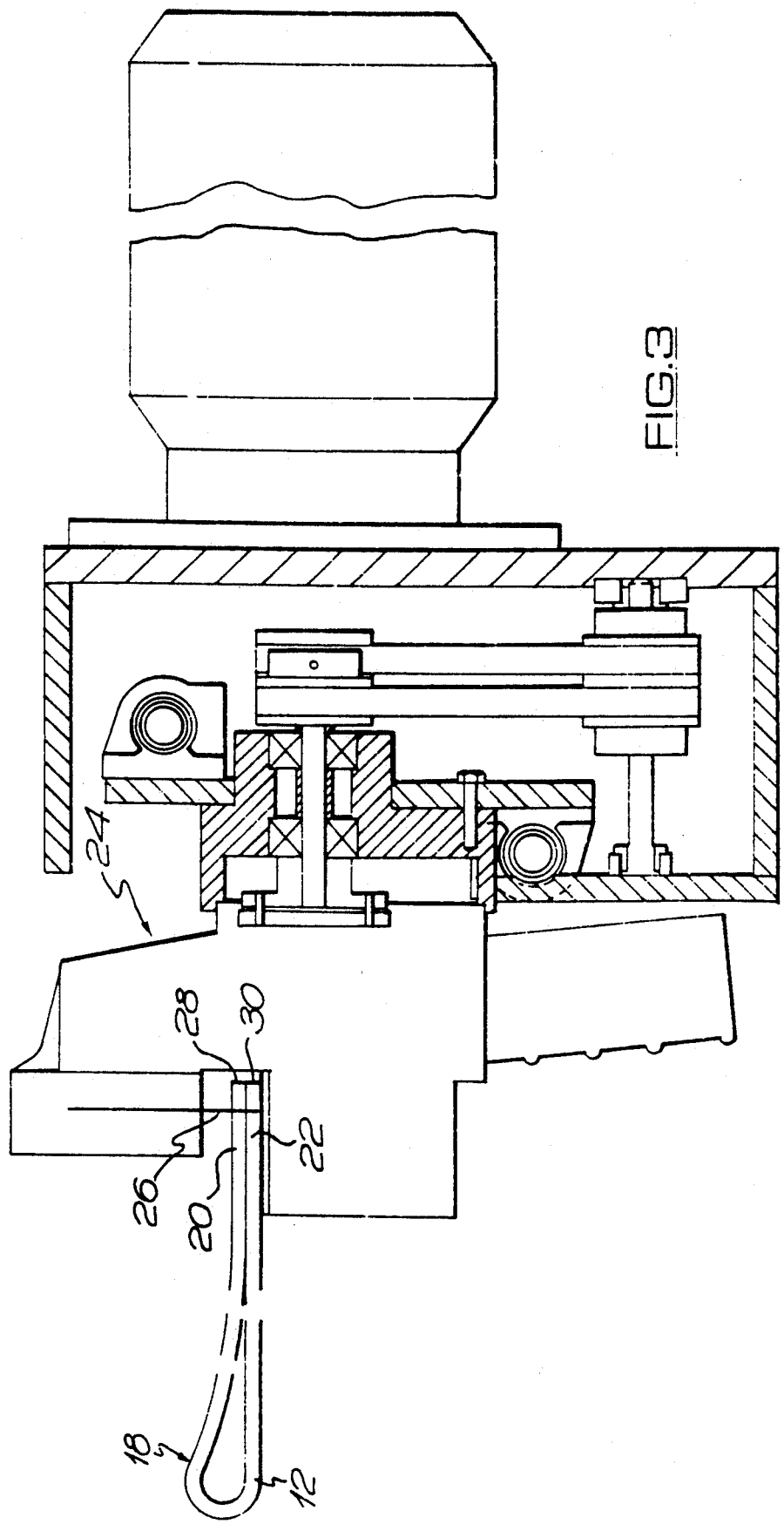
FIG. 3 is a view similar to FIG. 2, but showing the sewing machine head which is used for sewing the inner layer of the lining material in the arrangement of FIG. 1.
Figure 4:
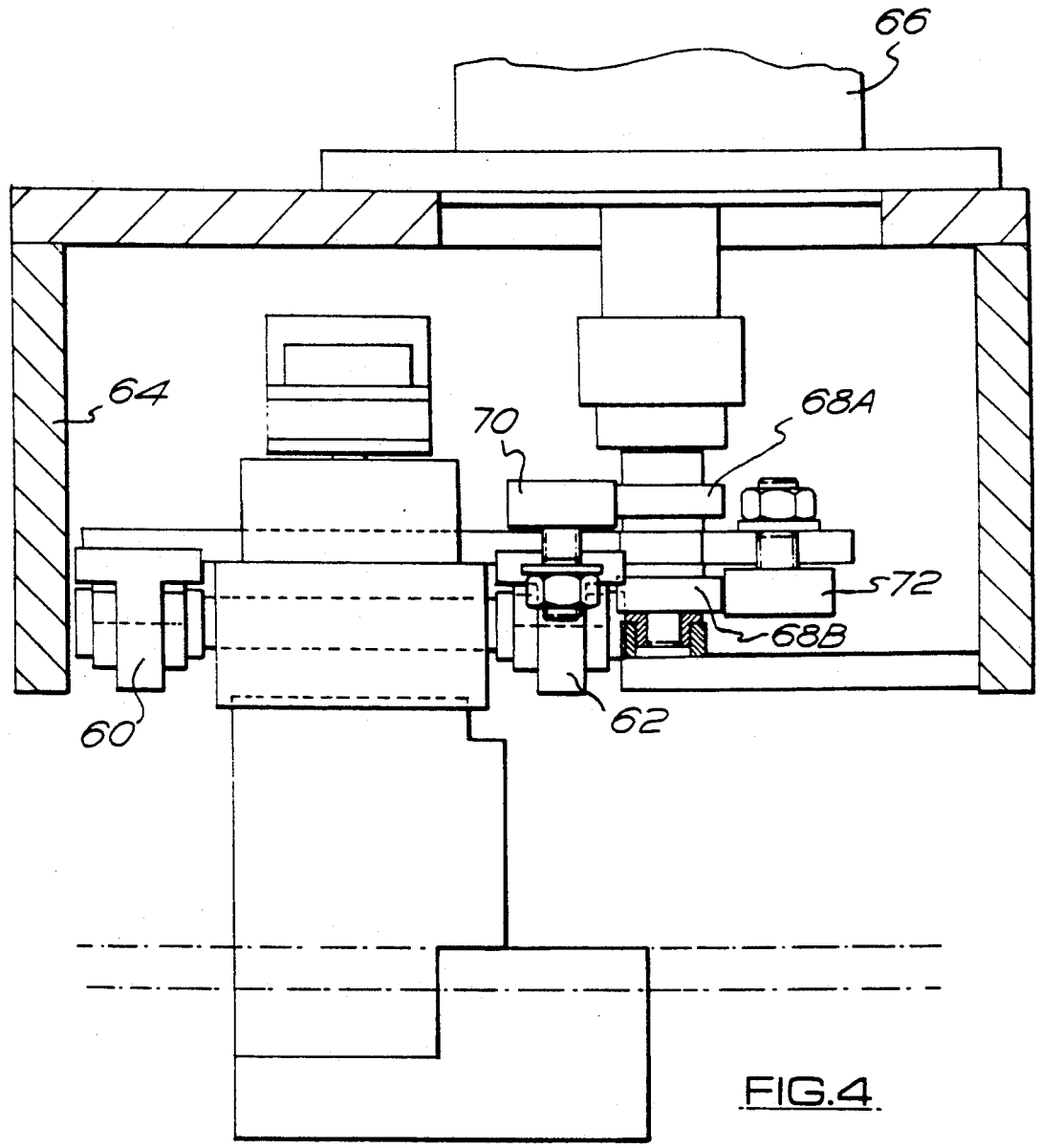
Figure 5:
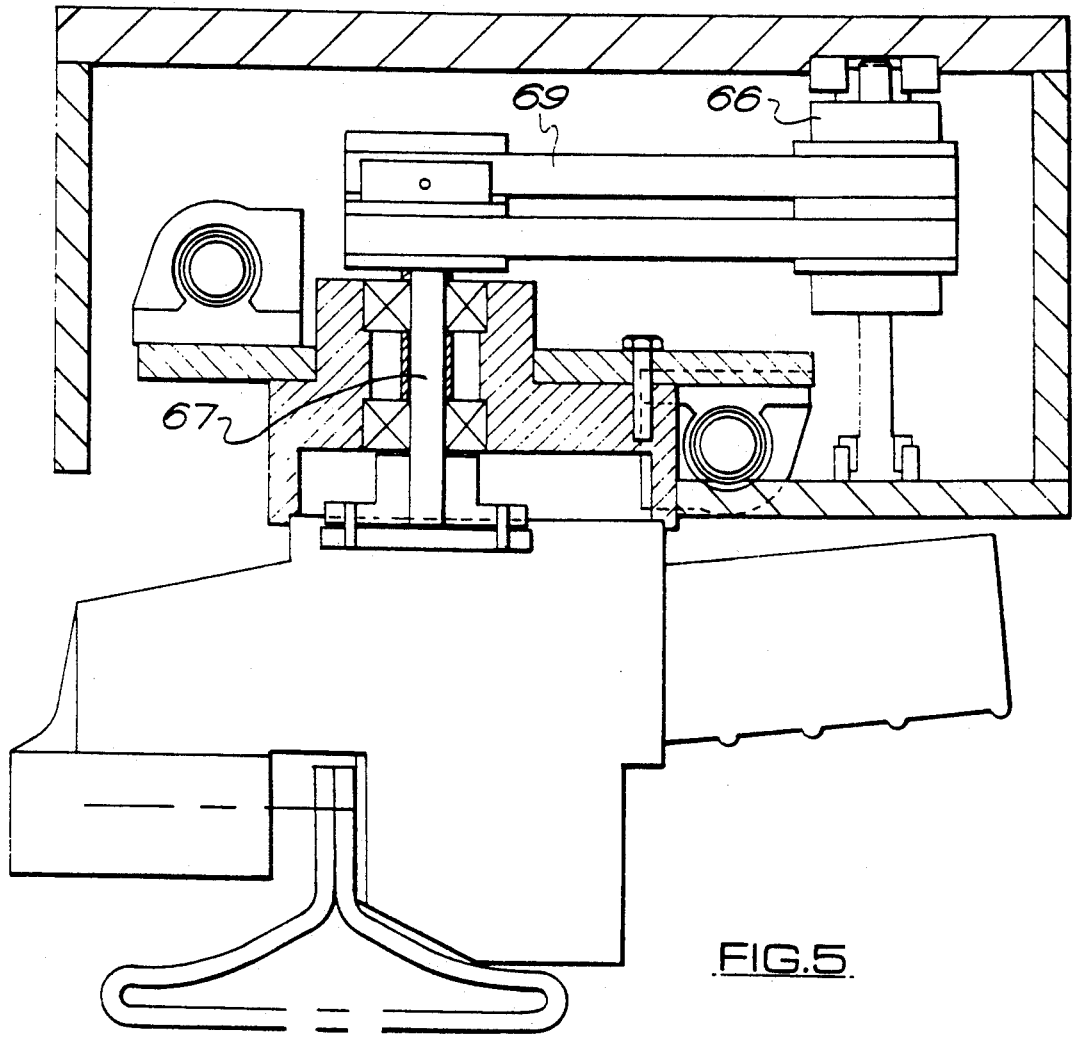
Figure 9:
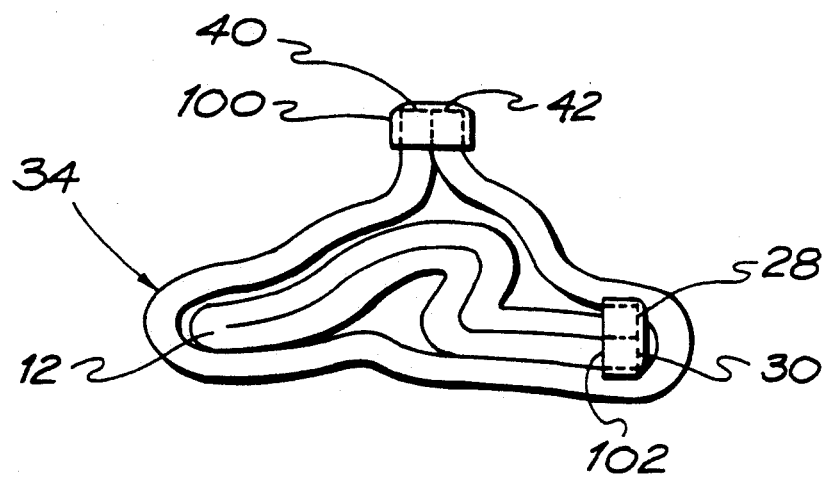

FIGS. 4, 5 and 6 respectively show a part-sectional side view, a part sectional end view and a plan view of a sewing head and its mounting, the sewing head being either a sewing head of FIG. 2 or the sewing head of FIG. 3;

FIG. 7 is a diagrammatic view to explain the operation of the cam drive;

FIG. 8 is a view to illustrate the sewing system;

FIG. 9 is a sectional view of the finished sewn lining material; and

Figure 10:
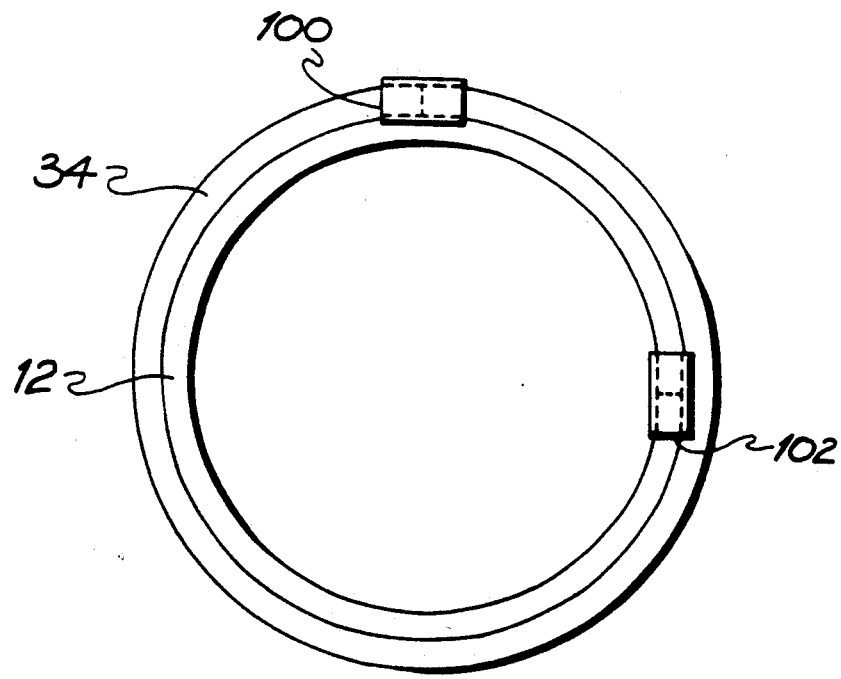

FIG. 10 shows the position taken by the lining material when in use.

Figure 1:
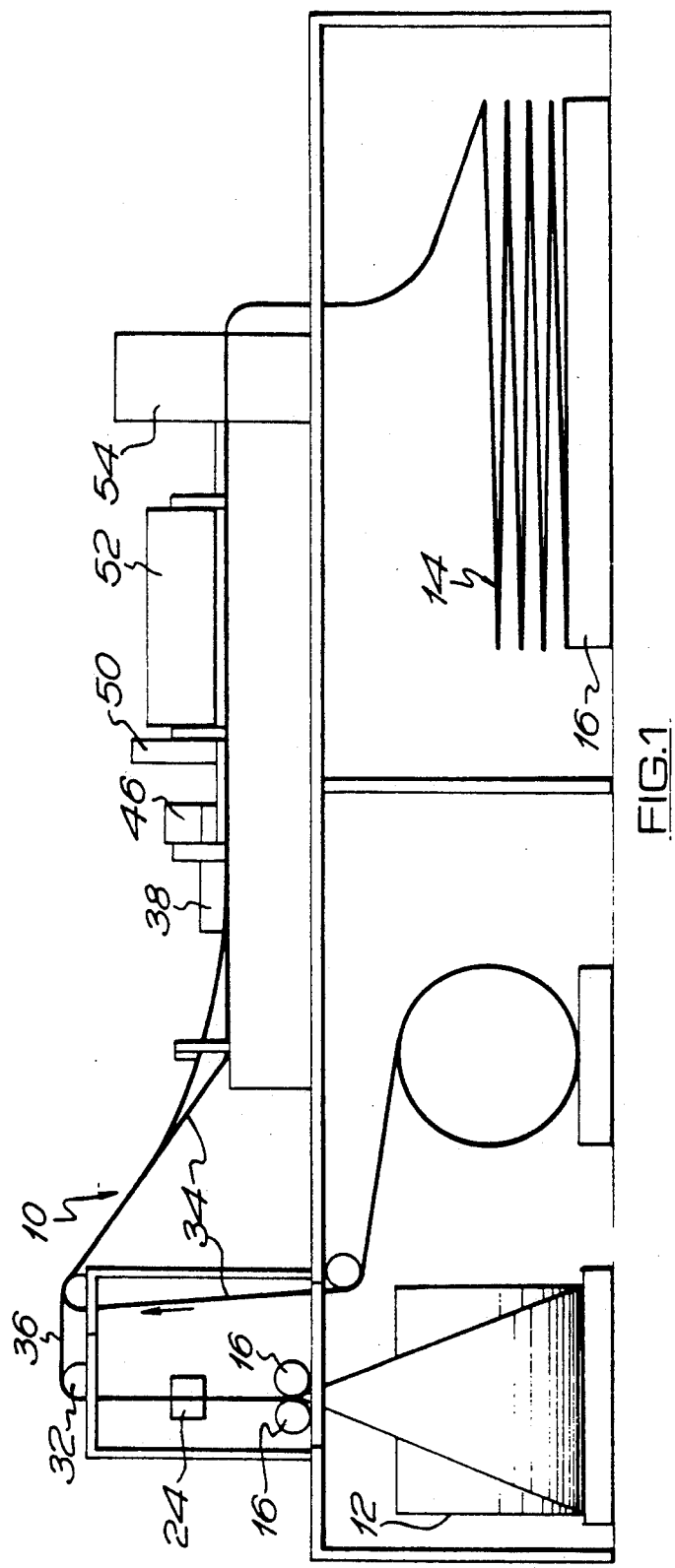
FIG. 1 is a diagrammatic side view of a machine for forming tubular lining material.

Referring to the drawings, and firstly to FIG. 1, a machine for producing tubular lining materials for soft lining processes is illustrated generally by reference numeral 10. This particular machine is for producing lining materials in tubular form made up of an inner layer of needled felt which has no coating on either side, and an outer layer of needled felt which is provided on one side with a coating to define the impermeable membrane referred to herein. It should be mentioned that if tubular materials of more than two layers are to be produced, then the machine would be extended to the left hand side as shown in FIG. 1 to provide further mounting arrangements for additional rolls of plain felt.

In FIG. 1 a roll of plain felt is indicated by reference 12, and it serves to form the inner layer of the finished tubular material which is shown as being stacked at 14 in concertina fashion on a suitable pallet 16. The roll of felt is unrolled continuously from roll 12 and is folded in two by means of forming rollers 16 so that the felt web takes up the condition shown at 18 in FIG. 3 wherein the felt is folded in two so that the free edges 20 and 22 come face to face. These edges are fed through a sewing machine 24 which is of conventional construction and in fact is a machine made by the Italian company Elcu-Sud Impianti, Model No. TC 101. The machine is a portable unit supplied with a low voltage electric motor drive and a built-in cutter to prepare the edges 20 and 22 of the material to be sewn. The edges are sewn along the line 26 inwardly of the extremeties thereof by sewing loops of a particular size so that when the material 12 is subsequently opened up to circular form as described, the extremeties 28, 30 of the edges 20 and 22 will come into butting contact.

The now sewn web 12 passes from the sewing machine over a guide roller 32 and onto the fibre surface of the travelling outer web 34 as indicated by reference 36 and the folded and sewn web 12 is carried by the web 34 through a guiding system 38 which ploughs up the edges of the outer web 34 to fold the web into tubular form so that the edges come into butting contact as indicated by reference 39 in FIG. 2 with the extremities of the edges 40 and 42 in the same plane. These face to face edges are sewn together along line 44 by a sewing machine 46 which is of identical construction to the sewing machine 24 which is used for sewing the edges of the inner web. Again the edges of the outer web 34 are sewn by loop stitches so that when the outer layer 34 is moved to circular form, the extremities 40 and 42 come into butting contact. It is to be mentioned that the outer surface 48 of the layer 34 comprises the coating material and that the inner web 12 is located inside the outer web 34 as shown. As the inner layer eventually has to lie outside the outer layer, circumferentially it may in fact be larger than layer 34.

The sewing machine 46 is illustrated in FIG. 1, and when the multi-layer tubular lining material leaves the sewing machine 46 it passes to a tape application unit 50 which may be of the nature as described in said European application, and this is followed by a unit 52 which applies heat to seal the tape, and which also embodies a recognition system for examining the stitches of the sewing. The recognition system preferably utilises close circuit television based image recognition, and the inspection of the stitching can be carried out using thread sensors of the optical type (as described hereinafter) linked to a programmable controller of the machine in order to detect stitch failure e.g. breakage or absence so that as soon as possible faults can be identified whereby the time taken to correct the fault is minimised and manual repair work can be carried out under factory conditions rather than on site which occurs if the failure or fault is not discovered until the material reaches the site.

The combined lining material is fed through the machine by means of pull-through rollers 54 and a suitable laying up mechanism is embodied in the machine for laying the completed lining material on the pallet 16 in concertina fashion, ready for transportation to the site.

Normally sewing machines for effecting the type of stitching operation illustrated herein embody a "feed dog" to feed the material through the sewing machine in an intermittent fashion so that the material is moved only when the sewing needle is clear of same. The purpose of this is to ensure that the feed of the material does not bend or break the needle. This method of sewing has some kinetic and efficiency problems. Because the material must be stopped and started, then due to inertia it is not always the case that there is an accurate feeding of the material at each feed step. Additionally, it is inefficient to feed the material in a step-wise manner. The sewing machines and their mountings in the machine illustrated are therefore modified in order to provide a more efficient sewing system.

Basically, the sewing machines move in a oscillatory manner during the sewing operation. That is to say the sewing machine moves in the direction of feed of the material from an end stroke position until it reaches the speed matching the speed of the material when the needle is caused to penetrate the material and perform a stitch. When the stitch has been completed the needle retracts, the machine travelling at the same speed as the material so that there is no side loading on the needle and after the needle has left the material in this forward stroke, the sewing machine is decelerated to an end of stroke position, and it is returned quickly to the beginning of stroke position and the cycle repeats. During this time, the material can be moved continuously, and preferably is moved continuously at a constant speed.

By this means there is as stated no side loading on the needle which could bend or break same. The programmable control system of the machine has a function to control the movement of the sewing machine in its oscillating path so that from the beginning of the sewing stroke, the machine is accelerated up to material matching speed before needle penetration takes place, and during sewing the machine travels at the same speed as the material. On retraction of the needle the sewing machine is decelerated to end stroke position and then is quickly returned to the beginning of stroke position in time to make the next stitch in the correct position. The controller controls the acceleration and deceleration of the sewing machine in accordance with signals derived from the feed rollers 54 ensuring smooth and efficient operation.

The drive system of each sewing machine is illustrated diagrammatically in FIGS. 4, 5 and 6 and 7 to achieve such a system, the commercially available sewing machine referred to herein is modified by removing the standard motor and also the material cutter system. The body of the sewing machine is milled to improve material handling and also accurate mounting of the new drive and oscillating system. To enable the sewing machine to execute the oscillatory movements, it is carried by linear bearings 60, 62 on a mounting frame 64 which is a stationary part of the machine. The motor 66 is coupled by belt drive 69 to a drive shaft 67 carrying cams 68A and 68B which serve to effect the oscillatory movement of the sewing machine. A first cam 68A drives through a follower roller 70 the sewing machine in its forward stroke, whilst a second cam 68B drives through a follower roller 72 the sewing machine in its reverse stroke and one revolution of the drive shaft 70 represents one complete cycle of movement of the sewing machine. In the rotation of the shaft 70 the forward motion of the sewing machine takes place during 270° of rotation of that shaft whilst the rearwards motion takes place over a rotation of the remaining 90° of the shaft. The travel of the sewing machine with particular example is a stroke of as little as 3.3 mm. The linear bearings 60 and 62 are of the low friction type and are arranged in alignment with the direction in which the material moves.

If reference is made to FIG. 7, the two cams 68A and 68B are shown as are their follower rollers 70 and 72. It will be appreciated that the cams 68A and 68B are concentric on the shaft 67, and rotate together as indicated by the arrows in FIG. 7. It can be seen that starting from the position shown, rotation of cam 68A displaces follower 70 to the right in FIG. 7 commencing the forward stroke of the sewing machine and for 270° cam 68A controls the forward stroke, but at the end of 278°, the cam surface of cam 68A starts to reduce in radius, whilst that of cam 68B increases in radius, and cam 68B takes over and displaces follower 72 on the return stroke to the left in FIG. 7. The followers 70 and 72 are fast with the sewing machine. At the position shown in FIG. 7, the needle is clear of the felt which is moving continuously. As the cams rotate from the FIG. 7 position, the sewing machine is driven in the forward stroke in the same direction as the felt until the of velocity of the sewing machine matches the velocity of the felt being sewed at which point the needle enters the felt. The needle leaves the felt near the end of the forward stroke whilst still travelling at the speed of the felt and then is returned on the return stroke to the initial position and the cycle repeats.

The type of stitch produced is arranged so that when the tube becomes circular the extremities of the material layers come face to face so that each layer will be of uniform wall thickness. The strength of the seam will be such as to be at least equal to the strength of material in tension (or hoop direction when the material is circular).

The sewing machine can be arranged to sew butted edges as described in said European application or face-to-face edges as described herein and the only modification to switch from one type of sewing to another is in relation to the keels used for leading the material to the sewing machine. Such keels are embodied in the guidance system 38 in FIG. 1.

By using the machine shown in FIG. 1, a much reduced production time is achieved for any given tubular lining material, and the layout of the machine in itself constitutes a new invention.

Referring to FIG. 8, the diagram shows a plurality of stitches 80 in the outer felt 34 which are constantly sensed by optical sensors 82 and 84. It is assumed that the felt is moving in the direction of arrow 86. The sensors 82 and 84 are coupled to a microprocessor 88 so that their outputs will be processed by such processor. The two sensors work in conjunction and each has a light transmitter and receiver. As the sensor 84 sees a stitch 80, it sends a signal or count to the processor 88. The sensor 82 works in similar fashion, but upon sensing a stitch sends a signal back to the processor 88 which resets the sensor 84 so that as long as all stitches are present, the sensor 84 will only count to a level of one. Sensor 84 is positioned so as to be located between stitches when sensor 82 is in register with a stitch. If a stitch is missing, then sensor 84 will miss the count indicating an error, but in order that spurious results will not be given, no warning is issued unless sensor 82 also subsequently misses the same stitch. It is possible because of dust or other interference that the sensor 84 may miss a stitch even although the stitch is present, but if both sensors miss the stitch then the likelihood is that the stitch is missing and an alarm is given.

It is possible to use the pulse counting system of the sensors to control the speeds of the pull through rollers 54 and the sewing machine motor to provide very accurate control of stitch pitch.

Referring to FIGS. 9 and 10, FIG. 9 shows the completed lining tube in the collapsed condition, and FIG. 9 shows the looped stitching (100) which holds together the free edges of the outer lining tube (34), and the looped stitching (102) which holds together the free edges of the inner lining tube (12).

FIG. 10 shows that when the lining tube is inflated into position, for example, in a sewer, and when impregnated with resin, the looped stitching (100) for the outer tube and (102) for the inner tube is such that the extremeties (40) and (42) of the outer tube come into butting relationship as do the extremeties (28) and (30) of the inner tube and consequently the resulting tube as shown in FIG. 10 does not have any double thickness regions. It is possible therefore to evert this tube with the advantages as referred to herein.

I claim:

1. A method of producing a flexible tubular lining for use in a soft lining process wherein the tubular lining is pressed by internal fluid pressure into circular form and onto a pipeline or passageway surface comprising the steps of
    (a) providing a first web of absorbent material having inner and outer sides, first web edges and first web regions of said inner side adjacent said first web edges,
    (b) forming the first web into a tubular body by folding the first web in two so that said first web regions come face-to-face,
    (c) sewing through said first web regions and around said first web edges loops of such size as to enable the first web edges to come into butting contact when the tubular lining is pressed as aforesaid,
    (d) providing a second web of absorbent material having inner and outer sides, second web edges and second web regions of said inner side adjacent said second web edges,
    (e) folding the second web into tubular form about the first web so that the second web regions come face-to-face, and
    (f) sewing through said first web regions and around said first web edges loops of such size as to enable the second web edges to come into butting contact when the second tubular lining is pressed as aforesaid.

2. A method according to claim 1, comprising sewing loops of the first web angularly offset in relation to the sewing loops of the second web, having regard to the circular form.

3. A method according to claim 2, wherein the sewing loops of the first web are angularly offset by 90 degrees relative to the sewing loops of the second web.

4. A method according to claim 1, wherein the method is carried out in a continuous operation in that the first web is fed continuously past a first sewing machine which sews the first web loops, and the second web is folded around the first web while the first web continues its movement, and a second sewing machine continuously sews the face-to-face regions of the second web.

5. A method according to claim 1 wherein each of the webs includes a needled felt of an appropriate fiber or mixture of fibers.

6. A method according to claim 1 wherein the second web comprises a synthetic felt provided on its outer surface with an impermeable coating or film of a synthetic resinous material, and the stitching of the second web is sealed by means of a sealing tape.

7. A method according to claim 2, wherein the method is carried out in a continuous operation in that the first web is fed continuously past a first sewing machine which sews the first web loops, and the second web is folded around the first web while the first web continues its movement, and a second sewing machine continuously sews the face-to-face regions of the second web.

8. A method according to claim 2, wherein each of the webs includes a needled felt of an appropriate fiber or mixture of fibers.

9. A method according to claim 2 wherein the second web comprises a synthetic felt provided on its outer surface with an impermeable coating or film of a synthetic resinous material, and the stitching of the second web is sealed by means of a sealing tape.

10. A method according to claim 3, wherein the method is carried out in a continuous operation in that the first web is fed continuously past a first sewing machine which sews the first web loops, and the second web is folded around the first web while the first web continues its movement, and a second sewing machine continuously sews the face-to-face regions of the second web.

11. A method according to claim 3, wherein each of the webs includes a needled felt of an appropriate fiber or mixture of fibers.

12. A method according to claim 3 wherein the second web comprises a synthetic felt provided on its outer surface with an impermeable coating or film of a synthetic resinous material, and the stitching of the second web is sealed by means of a sealing tape.

13. A method according to claim 7, wherein each of the webs includes a needled felt of an appropriate fiber or mixture of fibers.

14. A method according to claim 7 wherein the second web comprises a synthetic felt provided on its outer surface with an impermeable coating or film of a synthetic resinous material, and the stitching of the second web is sealed by means of a sealing tape.

15. A lining material for soft lining processes produced in accordance with the method set forth in claim 1.

* * * * *